(12) United States Patent
Gauthier et al.

(10) Patent No.: US 6,701,880 B1
(45) Date of Patent: Mar. 9, 2004

(54) METHOD AND APPARATUS FOR STARTING A MOTOR VEHICLE

(75) Inventors: Greg Edward Gauthier, Dearborn, MI (US); Venkateswa Anand Sankaran, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 116 days.

(21) Appl. No.: 10/063,333

(22) Filed: Apr. 12, 2002

(51) Int. Cl.$^7$ ............................................... F02N 17/00
(52) U.S. Cl. ................. 123/179.3; 123/179.5; 290/30 R
(58) Field of Search ............... 123/179.1, 179.3, 123/179.5, 179.21; 290/38 R, 50, 30 R, 30 A, 31, 36 R; 320/104

(56) References Cited

U.S. PATENT DOCUMENTS

| 5,343,970 A |   | 9/1994 | Severinsky et al. |
|---|---|---|---|
| 5,867,009 A | * | 2/1999 | Kiuchi et al. ................. 322/16 |
| 6,018,198 A |   | 1/2000 | Tsuzuki et al. |
| 6,020,697 A | * | 2/2000 | Shimasaki et al. .......... 318/140 |
| 6,032,753 A | * | 3/2000 | Yamazaki et al. .......... 180/65.3 |
| 6,057,671 A | * | 5/2000 | Kuno .......................... 320/130 |
| 6,186,255 B1 | * | 2/2001 | Shimasaki et al. ......... 180/65.3 |
| 6,247,437 B1 | * | 6/2001 | Yamaguchi et al. ..... 123/179.3 |
| 6,366,838 B1 | * | 4/2002 | Yoshino et al. ............... 701/22 |
| 6,367,570 B1 | * | 4/2002 | Long et al. ................ 180/65.2 |
| 6,563,230 B2 | * | 5/2003 | Nada ........................ 290/40 C |
| 6,569,055 B2 | * | 5/2003 | Urasawa et al. ............... 477/5 |
| 6,591,173 B2 | * | 7/2003 | Nada ........................... 701/29 |

\* cited by examiner

*Primary Examiner*—John Kwon
(74) *Attorney, Agent, or Firm*—John Chupa & Associates

(57) ABSTRACT

A method and an assembly 61 for use with a vehicle 10 having a high voltage battery 42 and an internal combustion engine 12 of the type having a selectively rotatable crankshaft 13 After the high voltage battery 42 receives a donor charge, the assembly 61 causes the crankshaft 13 to be rotated at a slow speed for a predetermined period of time before electrical energy is transferred to the internal combustion engine 12 and before combustion occurs within the engine 12.

12 Claims, 1 Drawing Sheet

METHOD AND APPARATUS FOR STARTING A MOTOR VEHICLE

BACKGROUND OF INVENTION (1) Field of the Invention

The present invention generally relates to a method and an apparatus for selectively rotating the crankshaft of an engine at a predetermined speed after electrical charge has been transferred to a vehicular battery during a jumpstart operation, thereby reducing the amount of electrical energy needed to start the engine, and to a vehicle which incorporates the method and more particularly, to a method and an apparatus which detects the occurrence of a transfer of charge to a vehicular battery and which, in response to the detected charge transfer, causes the vehicular engine to start at a relatively low speed and to ramp up slowly.

(2) Background of the Invention

A hybrid electric vehicle typically includes a high voltage and a low voltage battery which cooperatively provide energy which allow the vehicle to be operated in a desired manner. By way of example and without limitation, the high voltage battery is typically used to provide energy to and receive energy from at least one motor and/or a motor and generator assembly which are used to provide torque to the wheels of the vehicle, thereby allowing the hybrid electric vehicle to be selectively propelled and maneuvered. The low voltage battery provides energy for the various other vehicular components (e.g., such as a radio).

In the event that the high voltage battery becomes discharged or contains an amount of charge below which the battery cannot operate the at least one motor or the motor/generator assembly, the high voltage battery must be recharged, thereby allowing the hybrid vehicle to be started and operated.

Moreover, it is desirable to quickly charge the high voltage battery to a level in which the hybrid vehicle may be started in order to reduce the overall time in which the vehicle is disabled. Many of the currently utilized jumpstart strategies (e.g., a jumpstart or jumpstart operation may be defined as a selective transfer of electrical charge from a donor vehicle or battery to the high voltage vehicular battery and the use of the transferred charge to start the vehicle or operate an engine) do not allow the high voltage vehicular battery to be quickly charged and/or require the use of relatively large and expensive conductors or charging assemblies to communicate a relatively large charge to the high voltage battery.

SUMMARY OF INVENTION

A method and apparatus is provided for controlling the starting speed of an engine, after a vehicle has received a donor charge, in a manner which overcomes some or all of the previously delineated drawbacks of prior strategies and which, by way of example and without limitation, reduces the amount of electrical energy needed to startably operate the engine.

In accordance with another aspect of the present invention, an apparatus for rotating a crankshaft of an internal combustion engine after a donor charge has been communicated to a battery is provided. Particularly, the apparatus includes a first assembly which senses the transfer of the donor charge to the battery; and a second assembly which is coupled to the crankshaft and to the first assembly and which rotates the engine at a predetermined speed after the transfer of the donor charge is completed and before combustion occurs within the engine.

In accordance with yet another aspect of the present invention, a vehicle is provided having an internal combustion engine including a selectively rotatable crankshaft, a battery which is coupled to the engine, which supplies electrical energy to the engine, and which has a predetermined amount of electrical charge; and an assembly which is coupled to the engine and to the battery, which senses the occurrence of a predetermined loss of charge of the battery, which allows electrical charge to be communicated to the battery, and which rotates the crankshaft at a predetermined speed after the electrical charge has been communicated to the battery and before electrical energy is supplied to the engine.

In accordance with still another aspect of the present invention, a method is provided for operating a vehicle of the type having an internal combustion engine. Particularly, the method includes the steps of detecting a transfer of donor charge to a battery, and causing the engine to rotate at a predetermined speed before combustion occurs within the engine.

These and other features, aspects, and advantages of the present invention a vehicle is provided.

DETAILED DESCRIPTION

Figure 1:
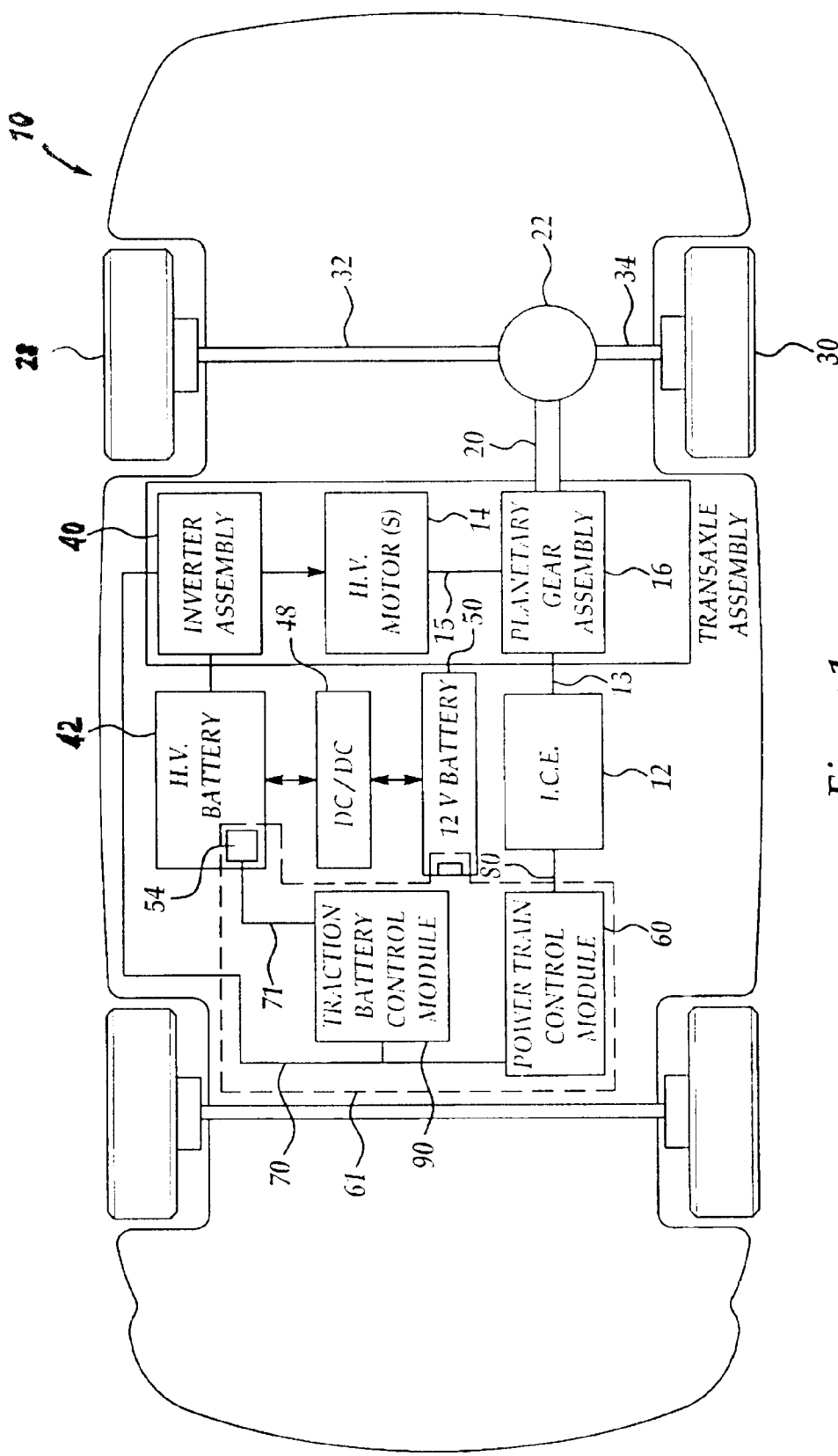
FIG. 1 is a block diagram of a vehicle which operates in accordance with the teachings of the preferred embodiment of the invention.

Referring now to FIG. 1, there is shown a vehicle 10 which is made in accordance with the teachings of the preferred embodiment of the invention. Particularly, vehicle 10 includes a first torque generator 12, such as and without limitation an internal combustion engine, and a second torque generator 14, such as and without limitation an electric motor/generator, one electric motor, or several cooperatively interconnected electrical motors. Particularly, the first torque generator (e.g., the internal combustion engine) 12 includes a selectively movable crankshaft 13 and the second torque generator 14 includes a selectively movable output shaft 15. The rotating crankshaft 13 and the output shaft 15 provide the torque necessary to selectively propel the vehicle 10.

As shown, the vehicle 10 further includes a planetary gear assembly 16 which is coupled to the crankshaft 13 and the output shaft 15, a selectively movable member 20 which is coupled to the planetary gear assembly 16, and a differential assembly 22 which is coupled to the selectively movable member 20. The differential assembly 22 is coupled to a pair of wheels 28, 30 by the respective use of axles or half-shafts 32, 34.

Further, as shown, the vehicle 10 includes an inverter assembly 40 which is coupled to the second torque generator 14, a high voltage battery 42 which is coupled to the inverter assembly 40, a direct current to direct current converter 48 which is coupled to the high voltage battery 42, and a low voltage battery 50 which is coupled to the direct current to direct current converter 48. Particularly, in one embodiment, the inverter assembly 40, the second torque generator 14, and the planetary gear assembly 16 cooperatively form a transaxle assembly.

The vehicle 10 further includes a controller assembly 60 (e.g., a powertrain controller assembly or module) which is operable under stored program control and which is coupled to the first torque generator or internal combustion engine 12, a traction battery controller assembly or module 90, and an electrical current sensor 54 which resides within and/or is operatively coupled to the high voltage battery 42 and which is coupled to the traction controller assembly 90 by the use of bus 71. Particularly, the sensor 54 senses the amount of electric current which is communicated to and/or which emanates from the high voltage battery 42. This information is communicated to the controller assembly 90 by the bus 71. Particularly, a state of charge estimator (not shown) resides with the traction battery controller assembly 90 and uses the information generated by the sensor 54 to continually determine the amount of electrical charge which is then currently present within the high voltage battery 42 (e.g., since the amount of electrical charge fluctuates within the high voltage battery 42, the controller assembly 90 must continually monitor this state of electrical charge in order to continually determine whether the high voltage battery 42 is being discharged). The controller assembly 60 is coupled to the torque generator 12 by the use of bus 80 and bus 70 provides a communication channel between the controllers 60, 90 and the inverter assembly 40. It should be appreciated that only the relevant portions of the vehicle 10 are shown in FIG. 1 and that the present invention is not limited to a particular type of vehicle. Rather, the present invention may be used with a wide variety of vehicles, including but not limited to non-hybrid vehicles or various dissimilar vehicular configurations. Further, it should be appreciated that the controller assembly 60 may include several operatively interconnected controllers or sensors and that nothing in this description is meant to limit the present invention to a particular type of vehicle or to a particular number of controllers and that controller assembly 60 and 90 in combination with sensor 54 cooperatively comprise an assembly 61 which performs the preferred method of the present invention as illustrated in FIG. 1 and which may be used within a hybrid vehicle in a retrofit or original equipment manner.

In normal operation, the controller assembly 60, by the use of bus 70 and 80, selects one or both of the torque generators 12, 14 to become operable. The torque which is produced by these torque generators 12, 14 is transferred to the planetary gear assembly 16 where it is transferred to the differential assembly 22 by the use of the output shaft or member 20. The differential assembly 22 distributes the received torque to the axles or half-shafts 32, 34 and the distributed torque is then communicated to the wheels 28, 30, thereby allowing the vehicle 10 to be selectively propelled and maneuvered.

The electrical current sensor 54 in conjunction with the state of charge estimator (not shown) which may be embodied within software, firmware, and/or hardware which is operatively located within controller 90 detects when the high voltage battery 42 has become discharged or has an insufficient amount of electrical charge to operate the second torque generator 14. This information is transmitted to the controller assembly 90 and the assembly 90 communicates this information to the controller assembly 60. The controller assembly 60 then causes the battery 50 (or allows a donor battery) to provide electrical charge to the high voltage battery 42. After the high voltage battery 42 has been given a relatively small amount of electrical charge the controller assembly 90, by use of the current sensor 54 and/or the charge estimator senses this occurrence and a signal or "flag" is sent to the controller assembly 60 by the controller assembly 90. The controller assembly 60 then commands the inverter assembly 40, by the use of bus 70, to operate the second torque generator 14 in order to spin or rotate the engine 12 (i.e., spin or selectively rotate the crankshaft 13) at a relatively low rate of speed, such as and without limitation a rate of speed of about two hundred revolutions per minute, for about one second to about ten seconds. After this rotation is accomplished, electrical energy may be communicated the engine 12, from the battery 42 (or from the battery 50), in order to allow combustion to occur within the engine 12 and to allow the engine 12 to be combustibly started. Thus, the foregoing allows the internal combustion engine 12 to be started with a significantly lower amount of power or energy than the internal combustion engine 12 normally uses during a "fast starting" or "normal starting" event, thereby allowing the high voltage battery 42 to use less energy to start the internal combustion engine 12 and concomitantly reducing the amount of energy or electrical charge required by the high voltage battery 42 to start the internal combustion engine 12 and to jumpstart the vehicle 10. Such a reduction in the amount of required energy reduces the time to charge the high voltage battery 42 (allows the battery 42 to be only partially changed) and obviates the need for costly cables and charging assemblies while reducing the likelihood of battery damage and reducing the total amount of time in which the vehicle 10 is disabled. Further, the present invention, by reducing the amount of electrical current which is transferred to the high voltage battery 42 during the charging process, extends the operating life of the battery and obviates the need for cooling fans and other cooling assemblies.

It is to be understood that the invention is not limited to the exact construction and method which has been illustrated above, but that various changes and modifications may be made without departing from the spirit and the scope of the inventions as are delineated in the following claims.

What is claimed is:

1. An apparatus for rotating a crankshaft of an internal combustion engine after a donor charge has been communicated to a battery, said apparatus comprising a first assembly which senses the transfer of said donor charge to said battery; and a second assembly which is coupled to said crankshaft and to said first assembly and which rotates said crankshaft at a predetermined speed after said transfer of said donor charge is completed and before combustion occurs within said engine.

2. The apparatus of claim 1 wherein said first assembly comprises a controller; and an electric current sensor.

3. The apparatus of claim 1 wherein said second assembly comprises a torque generator.

4. The apparatus of claim 1, wherein said crankshaft is rotated only for a predetermined period of time.

5. The apparatus of claim 1, wherein said second assembly further comprises an inverter which is coupled to said torque generator.

6. The apparatus of claim 1, wherein said donor charge only partially charges said battery.

7. A vehicle having an internal combustion engine including a selectively rotatable crankshaft; a battery which is coupled to said engine, which supplies electrical energy to said engine, and which has a predetermined amount of electrical charge; and an assembly which is coupled to said engine and to said battery, which senses the occurrence of a predetermined loss of charge of said battery, which allows electrical charge to be communicated to said battery, and which rotates said crankshaft at a predetermined speed after said electrical charge has been communicated to said battery and before electrical energy is supplied to said engine.

8. The vehicle of claim 7 wherein said battery is only partially charged after recieving said predetermined amount of charge.

9. The vehicle of claim 8 wherein said crankshaft is rotated at said predetermined speed for only a predetermined period of time. 2

10. A method for operating a vehicle of the type having an internal combustion engine, said method comprising the steps of detecting a transfer of a donor charge to a battery; and causing said engine to rotate at a predetermined speed before combustion occurs within said engine.

11. The method of claim 10 wherein said engine is operated at said predetermined speed only for a predetermined period of time.

12. The method of claim 10 wherein said engine is operated at a predetermined speed only during the starting of said engine.

* * * * *